United States Patent [19]

Graham

[11] 4,320,520

[45] Mar. 16, 1982

[54] TRANSMITTER/RECEIVER FOR USE ON COMMON CABLE COMMUNICATIONS SYSTEM SUCH AS ETHERNET

[75] Inventor: Martin H. Graham, Berkeley, Calif.

[73] Assignee: Rolm Corporation, Santa Clara, Calif.

[21] Appl. No.: 163,573

[22] Filed: Jun. 27, 1980

[51] Int. Cl.³ .............................................. H04B 3/00
[52] U.S. Cl. ......................................... 375/36; 375/8; 370/84; 370/92; 370/118
[58] Field of Search ........................ 375/36, 8; 370/118, 370/79, 84, 85, 93, 92; 358/133, 134, 135, 137; 340/147 LP, 147 R, 345, 346

[56] References Cited

U.S. PATENT DOCUMENTS 2,564,419  8/1951  Brown ................................. 370/84
3,441,674  4/1969  Giordano et al. .................... 370/84
3,851,104  11/1974  Willard et al. ...................... 370/84

Primary Examiner—John W. Caldwell, Sr.
Assistant Examiner—Donnie Lee Crosland
Attorney, Agent, or Firm—Blakely, Sokoloff, Taylor & Zafman

[57] ABSTRACT

An improved transmitter/receiver for use on a common cable communications system which permits sending and receiving of data at multiple data rates. Each transmitter first transmits a message alerting the intended receiver. The message also informs the receiver of the rate at which data is to be transmitted. This data rate is a function of the available bandwidth between the transmitting transmitter and receiving receiver. Each transmitter includes a memory of such bandwidth for all receivers on the cable.

10 Claims, 6 Drawing Figures

TRANSMITTER/RECEIVER FOR USE ON COMMON CABLE COMMUNICATIONS SYSTEM SUCH AS ETHERNET

BACKGROUND OF THE INVENTION

1. Field of the Invention

The invention relates to communications systems, particularly systems where a plurality of receivers and transmitters are coupled to a common bus or cable.

2. Prior Art

In some communications systems, it is desirable to couple many transmitters and receivers to a common cable or bus. For example, a single coaxial cable is routed to several buildings in a complex, with several transmitters and receivers (or transceivers) at each building coupled to the cable. Data is then transmitted from a transmitter to a selected (addressed) receiver or group of receivers. The rate at which data is transferred is limited by the bandwidth of the entire cable. A data rate of 3 megabits per second for a mile of cable is typical in these systems.

In one such communications system (Ethernet) a plurality of transceivers are permitted to transmit at any time when transmission from another transceiver is not detected. Obviously, with this system, it is possible for interference to occur between the transmissions of two transceivers. In U.S. Pat. No. 4,063,220, a circuit is described for detecting interference between the transmissions of transceivers in an Ethernet and for controlling retransmission at more random times to prevent continued interference. Other circuits associated with an Ethernet system are described in this patent.

The present invention is particularly useful in an Ethernet system although it has applications in other communications systems where a common cable is employed. The effective data rate is substantially increased with the apparatus of the present invention. In a typical arrangement with 6,000 feet of cable, an increase in data transfer of two to three, or more, is realizable.

SUMMARY OF THE INVENTION

The present invention is most advantageously used in a communications system where a plurality of transmitters, receivers, or transceivers are spaced-apart along a common cable. The common cable provides a communications path between the transmitters and selected receivers. Each of the transmitters are adapted to transmit data at multiple data rates which includes a first (lowest) data rate and a plurality of other rates. The lowest data rate is sufficiently low to permit transmission between the furthest apart of the transmitters and receivers. Each of the transmitters includes data rate selection means for selecting one of the plurality of other data rates as a function of the available bandwidth along the cable between the transmitter which is transmitting and the receiver for which the transmission is intended. Each of the receivers is adaptable for receiving data at multiple data rates and is able to adjust its reception rate. A header is first transmitted at the lowest data rate to alert the selected receiver and to provide it with a code representing the data rate at which data will be transmitted to it.

DETAILED DESCRIPTION OF THE INVENTION

An improvement to a communications system which uses a plurality of transmitters and receivers on a common cable such as in an Ethernet system is described. In the following description for purposes of explanation, specific numbers, etc., are set forth in order to provide a thorough understanding of the present invention. However, it will be obvious to one skilled in the art that the present invention may be practiced without these specific details. In other instances, well-known circuits are shown in block diagram form in order not to obscure the present invention in unnecessary detail.

Figure 1:
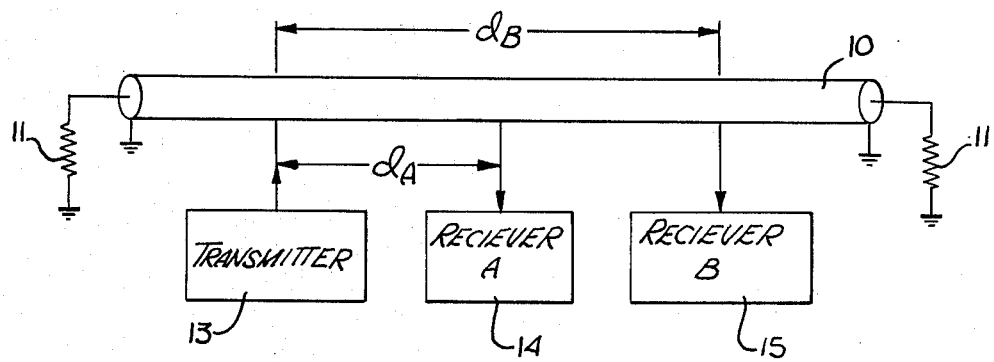
FIG. 1 is a block diagram illustrating a communications system wherein a transmitter and two receivers are coupled to a common cable.

Referring now to FIG. 1, a cable 10 is shown which is terminated in terminators shown as resistors 11. For purposes of discussion, a single transmitter 13 is shown coupled to this cable, along with two spaced-apart receivers, receiver A (14) and receiver B (15). The transmitter is separated from the receiver A by a distance $d_A$, while receiver B is separated from transmitter 13 by a longer distance, $d_B$.

Figure 2:
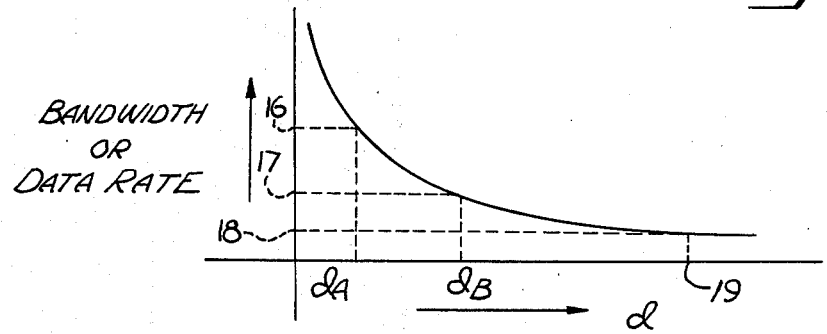
FIG. 2 is a graph illustrating bandwidth versus cable length for the communications system of FIG. 1.

In the graph of FIG. 2, distance along the cable 10 of FIG. 1 as measured from the transmitter 13, is plotted along the abscissa. The bandwidth along the cable from the transmitter 13 is plotted along the ordinate. The rate at which data can be transmitted along the cable is a function of the bandwidth of the cable. As is apparent from FIG. 2, the bandwidth available between a transmitter and a receiver separated by only a short distance along the cable, is greater than the available bandwidth between the transmitter and a receiver further away.

Relating FIG. 1 to FIG. 2, the available bandwidths between transmitter 13 and receivers A and B are shown in FIG. 2 at points 16 and 17, respectively. As is apparent, the bandwidth between the transmitter and receiver A is substantially greater than the bandwidth between the transmitter and receiver B. In a typical prior art system, the data rate is limited by the bandwidth available between the furthest apart transmitter and receiver. By way of example, in FIG. 2, if point 19 represents the furthest distance between a transmitter and receiver on cable 10, the bandwidth for the entire system would be limited by the bandwidth at point 18.

The present invention provides better utilization of the cable 10 by transmitting data at various rates. The rate is determined by the distance between the transmitting transmitter and the receiving receiver. Again referring to FIG. 2, if transmitter 13 is communicating with receiver A, then a data rate corresponding to point 16 is used, whereas if the transmitter is communicating with receiver B, a lower data rate (point 17) is used. In a typical application where a plurality of transmitters and receivers are coupled to a single cable, it is advantageous for the transmitters to transmit at a plurality of different rates, and also for the receivers to receive at a plurality of different rates.

With the present invention, when a transmitter begins to transmit, it first transmits a message (hereinafter referred to as a "header") at a data rate sufficiently slow to allow reception by the most remotely located transmitter and receiver on the cable. All receivers receive the header and from it, determine the identity of the receiver or receivers to receive data and the data rate at which the data will be transmitted. The transmitter has stored in memory the data rate which is to be used between itself and each of the receivers. The various data rates are determined as a function of the available bandwidth between the transmitters and each of the receivers.

Figure 3:
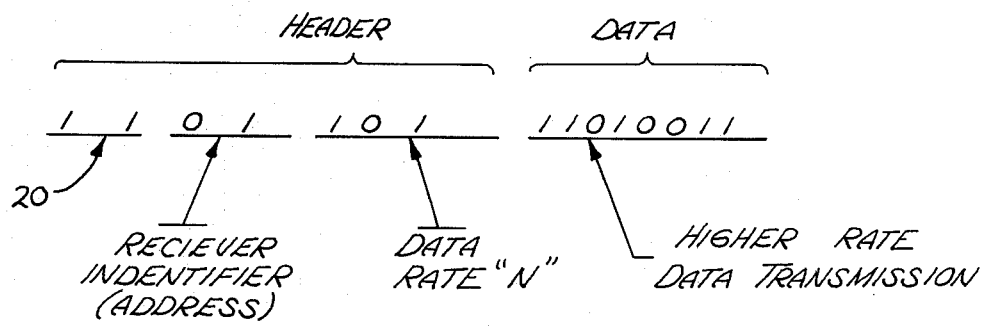
FIG. 3 is an illustration of a digital message used with the present invention.

Referring to FIG. 3, a typical message format for transmission between a transmitter and receivers is shown. The segment 20 represents an initiating signal to alert the receivers to the fact that a transmission is to begin. Following this, the transmitter transmits the identity (address) of the receiver or receivers for which the transmision is intended. The length of this address will depend, of course, upon the number of receivers along a given cable. A 2-bit code is shown in FIG. 3 for purposes of explanation. With this code, one of four receivers may be addressed. In some applications, it may be desirable to have more address codes available than receivers so that some address codes can be used to alert more than a single receiver. This is useful where a transmitter is to simultaneously transmit to more than a single receiver.

Following the address, the header concludes with a code representing the data rate. As will be seen in the presently preferred embodiment, this digital code represents a number "N," which is used as a divisor. After the header, the data is then transmitted. As shown in FIG. 3, for purposes of illustration, the data is shown transmitted at twice the rate of the header. The commonly employed message acknowledgements, etc., known in the prior art are not shown in FIG. 3, nor discussed elsewhere in this application.

Figure 4:
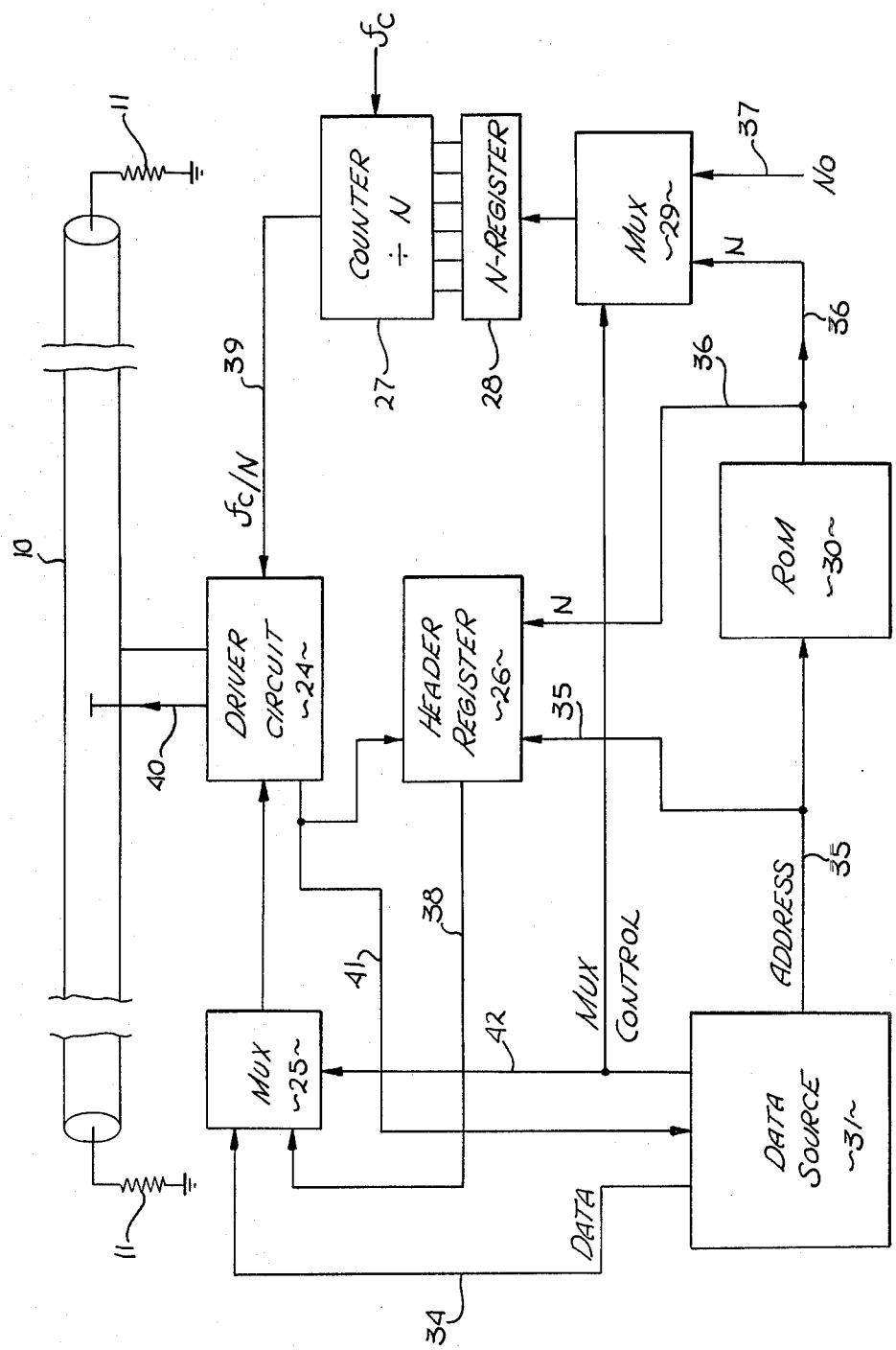
FIG. 4 is a block diagram of a transmitter which includes the presently preferred embodiment of the invention.

Referring now to FIG. 4, a portion of a common cable 10 is illustrated, the ends of which are again terminated in terminators such as resistors 11. It is assumed that a plurality of other transmitters and a plurality of receivers are also coupled to the coaxial cable 10. The transmitter shown in FIG. 4 (which may be part of a transceiver) is coupled to the cable 10 through line 40; serialized data preceded by the header as shown in FIG. 3 is communicated to the cable 10 on line 40.

The transmitter of FIG. 4 may be used with a plurality of data sources such as computers, data entry terminals, memories, etc. For purposes of discussion, a data source 31 is illustrated which provides data on line 34 and an address signal on line 35 which identifies the receiver or receivers for which the data is intended. It is assumed that the data source 31 provides the address in parallel form on line 35 (a multiple path line) and data in serial form on line 34. The data source 31 also provides a control signal to indicate when data is transmitted from the data source 31. Other well-known timing signals and control signals associated with data sources are not illustrated in FIG. 4.

The address on line 35 is coupled to a "header" register 26 and to a read-only memory (ROM) 30. The ROM 30 is programmed to provide a number "N" for each address signal it receives from the data source 31. The number "N" is communicated to the multiplexer 29 on line 36 and to the register 26. The multiplexer 29 is also coupled to receive a constant digital number $N_o$ on line 37 and selects between either the digital number on line 36 or the digital number $N_o$. The output of the multiplexer 29 is coupled to a register 28 which, in turn, is coupled to a counter 27. The counter 27 divides the frequency $f_c$ by the number (N) in register 28. Thus, the output of the counter 27, line 39 is shown as $f_c/N$. The $f_c$ signal is generated by a crystal controlled oscillator and each of the transmitters and receivers include such an oscillator.

The register 26 transmits the header shown in FIG. 2 in serial form on line 38. The multiplexer 25 selects either the header from line 38 or the data from line 34. The output of the multiplexer 25 is coupled to a cable driver circuit 24.

The driver circuit 24 which may be an ordinary clocked driving circuit, couples the signal from the multiplexer 25 onto the cable 10 at the rate of a clocking signals received on line 39, $f_c/N$. This circuit provides a timing signal on line 41 to the data source 31 and register 26 to control the header and data flow rates.

Assume for sake of discussion that $f_c$ is equal to 60 MHz. Further assume that the available bandwidth on the cable 10 between the furthest apart transmitter and receiver is 3 MHz ($N_o=20$). Assume now that it is necessary to communicate data from the data source 31 to a receiver A along the cable 10, and that the available bandwidth between the transmitter and receiver A is 10 MHz. The ROM 30 is programmed such that the address for receiver A on line 35 provides N=6 on line 36. The digital number representing N=6 is then communicated both to the multiplexer 29 and to the register 26. Initially, the multiplexer 29 selects $N_o=20$ and the N register 28 is set $N_o=20$. During the transmission of the header, the multiplexer 25 selects line 38 and the signal on line 39 is 3 MHz. The header is then transmitted onto the cable from the register 26 through the multiplexer 25 and driver circuit at the 3 MHz rate. Receiver A, upon receiving the header, adjusts its reception to the 10 MHz rate since it also receives N=6. After the header has been transmitted, the data source 31 provides a control signal on line 42 to both the multiplexers 25 and 29. Multiplexer 25 then selects the data on line 34. The multiplexer 29 selects the output of the ROM 30 and the N register 28 is set to N=6. When this occurs, the 60 MHz signal $f_c$ is divided by 6 to provide the 10 MHz clocking signal on line 39. Then the data is transmitted onto the cable 10 through line 34 at the 10 MHz rate.

Each of the transmitters on the cable 10 has its own ROM 30 which is programmed with a plurality of numbers "N", each of which is determined by the available bandwidth between that particular transmitter and each of the receivers on the cable. The number $N_o$ is the same for all of the transmitters on the cable. This number is changed, for example, when the cable 10 is lengthened or shortened.

Figure 5:
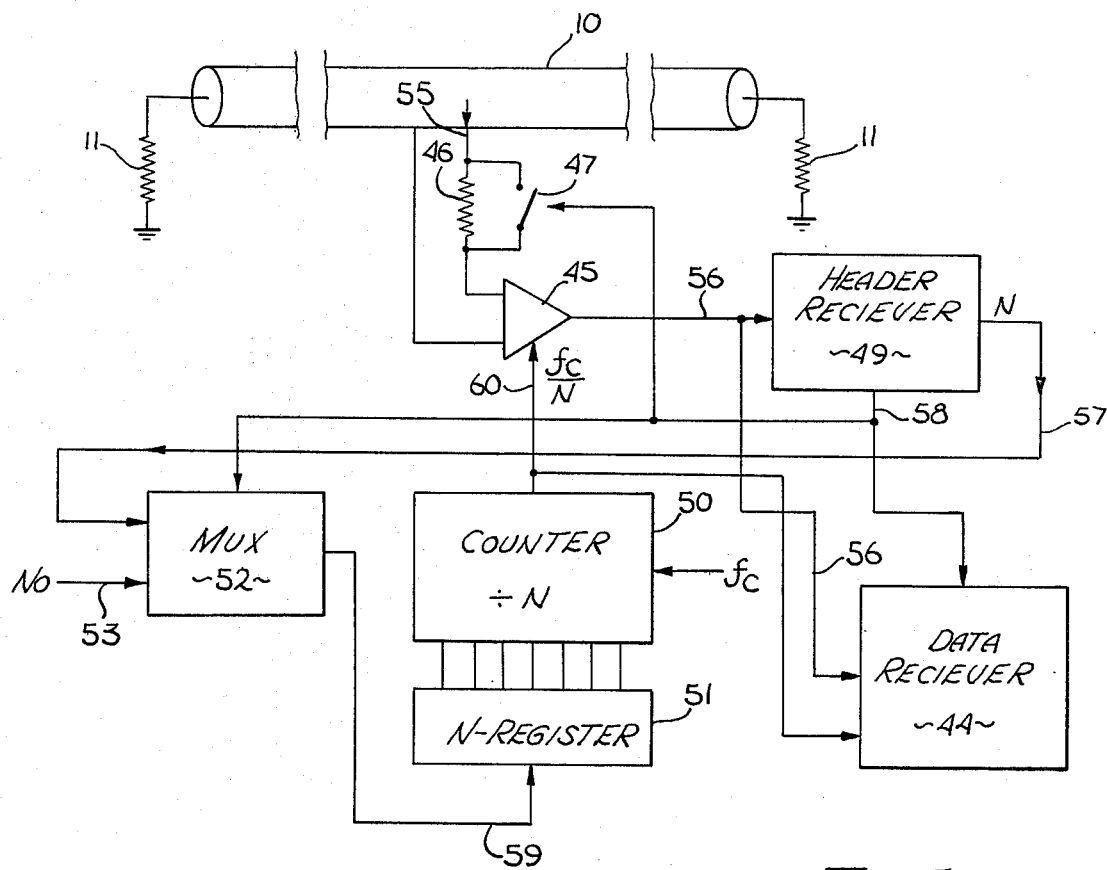
FIG. 5 is a block diagram of a receiver which includes the presently preferred embodiment of the invention.

Referring now to FIG. 5, a receiver is shown coupled to the cable 10. An emitter-coupled logic amplifier 45 receives the signal from the cable 10 through line 55 and resistor 46. A shunting switch 47 is coupled across the resistor 46; this switch is controlled by a signal on line 58. The amplifier 45 is clocked to receive signals from the cable 10 at a rate controlled by the signal on line 60. This signal is represented by $f_c/N$. The output of the amplifier 45 is coupled both to a header receiver 49 and to a data receiver 44.

The data receiver 44 may be any one of a plurality of digital processors, memories, etc., and as is often the case, the data receiver 44 is an integral part of a data source 31, with the receiver of FIG. 5 being combined with the transmitter of FIG. 4 in a transceiver configuration.

The header receiver 49 includes a register for receiving the header. The address portion of the header is compared with the address of the receiver to determine if the receiver is intended to receive data within receiver 44. If the receiver is addressed, then a signal is coupled on line 58 to the data receiver 44, multiplexer 52 and the switch 47. The receiver 49 also receives the number "N" and communicates this number on line 57 to the multiplexer 52. The output of the multiplexer 52 which is either the number "N" from the receiver 49 or $N_o$ from line 53 is coupled to the register 51. Again, as in the case of the transmitter, the receiver includes a counter which divides by N. Counter 50 also receives $f_c$ and provides a clocking signal, $f_c/N$ (or a signal representative of this frequency) on line 60 to the amplifier 45.

Assume for purposes of discussion that a header is transmitted on the cable 10. During this transmission, the multiplexer 52 is selecting line 53. Thus, $N_o$ or the number 20 (continuing the above example) is in register 51. The counter 50 divides 60 MHz by 20 and the amplifier 45 is clocked to receive signals at the 3 MHz rate. When the header is received, it is communicated through the amplifier 45 into the receiver 49. If the receiver of FIG. 5 is selected to receive data, then the switch 47 is closed, the receiver 44 is alerted and the multiplexer 52 selects "N" from line 57 and couples it to the register 51. The counter 50 then provides, for example, a 10 MHz signal and the amplifier 45 then receives data at the rate at which it is transmitted.

The purpose of the switch 47 is to decrease the input impedance of the selected (addressed) receiver. This increases the power from the cable delivered to the addressed receiver. Note that the other receivers have equivalent switches which remain open, and thus, only the selected receiver presents a lower input impedance. This improves the signal-to-noise ratio and enables transmission at a higher rate.

Figure 6:
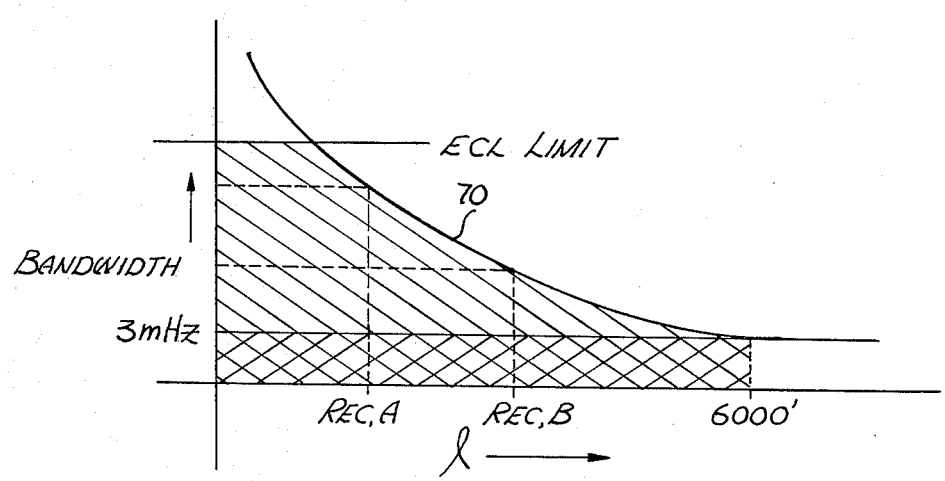
FIG. 6 is a graph used to illustrate the increased data rate obtained through use of the present invention.

Referring now to FIG. 6, the curve 70 illustrates available bandwidth versus distance (1) along a cable such as cable 10. The curve 70 (as does the graph of FIG. 2) illustrates that very high bandwidths are available for short distances and that the bandwidth drops off to a lower limit of approximately 3 MHz at 6,000 feet. The effective available bandwidth for short distances when the receivers are considered, is limited by the upper frequency limit of the receivers. The line "ECL limit" is used to illustrate the upper limit of bandwidth when ECL receiver circuits are used.

The area between the abscissa and the 3 MHz line represents the bandwidth-length product used in prior art systems. The area below the ECL limit and bounded by curve 70 represents the bandwidth-length product available with the present invention. The ratio of these areas is the improvement factor obtained through use of the present invention. As may readily be seen, in a typical application, an improvement of 3 to 4, or more is easily obtained. Thus, substantially more data may be transmitted on a given cable. Transmitting data at a higher rate also reduces the probability of interference, and provides a further overall improvement in an Ethernet network.

In the above examples, it has been assumed that the distances along the cable between each of the transmitters and receivers is known. It is these distances which permit the determination of the available bandwidth and the calculation of "N". In some cases, these distances are not known, or may not remain constant. For example, where transmitters or receivers are disconnected from the cable and reconnected at a different point along the cable, then the data stored within ROM 30 must be updated. In this situation, the transmitter may determine the highest possible transmission rate between itself and any given receiver. This is done by transmitting first at the highest possible rate and waiting for an acknowledgement. If no acknowledgement is received, or if the acknowledgement indicates that the data was not correctly received, then the transmitter continually steps down its transmission rate until an acknowledgement is received. It is assumed that the highest rate at which data is received by a receiver can be again used and the transmitter can store the "N" in a memory. This number can be updated periodically, or any time a correct acknowledgement is not received from a particular receiver.

Thus, an apparatus has been described for use on transmitters and receivers which are coupled to a common cable. The apparatus permits transmission between a transmitter and receivers on this cable at the highest possible rate as opposed to transmitting at a lowest end-to-end rate. The header provides the receiver with a signal, permitting the receiver to adjust its reception rate to the rate at which it will receive data.

I claim:

1. In a data communication system having at least one transmitter and a plurality of receivers, and where said transmitter and receivers are coupled to a common cable at spaced-apart points along said cable, an improvement comprising:
   multiple data rate transmission means, coupled to said transmitter for enabling transmission of data by said transmitter at a plurality of rates; and,
   selection means, coupled to said multiple data rate transmission means, for selecting said plurality of rates as a function of the bandwidth of said cable between said transmitter and the one of said receivers to which data is transmitted;
   whereby data may be transmitted at a faster rate to receivers which are closer, therby better utilizing the capacity of said cable.

2. The improvement defined by claim 2 wherein each of said receivers includes means for receiving data at said plurality of rates.

3. The improvement defined by claim 1 wherein said transmitter includes message means for preparing predetermined messages which are communicated to said cable.

4. The improvement defined by claim 3 wherein said messages identify said one of said receivers to which data is transmitted and one of said plurality of rates.

5. The improvement defined by claim 4 wherein each of said receivers includes means for reducing its input impedance, said means being activated in response to certain of said messages.

6. In a data communications system where a plurality of transmitters and receivers are spaced-apart along a common cable, said cable providing a common communications path for the communications of data between said transmitters and receivers, an improvement comprising:

multiple data rate transmission means coupled to each of said transmitters for enabling the transmissions of data at a first data rate and at a plurality of other data rates; said first rate permitting transmission of data between the furthest apart of said transmitters and receivers;

data rate selection means coupled to said multiple data rate transmission means for selecting said plurality of other data rates as a function of the available bandwidth along said cable between the one of said transmitters which is transmitting and the furthest one of said receivers for which said transmission is intended; and multiple data rate reception means coupled to each of said receivers for enabling the reception of data at said first rate and at said plurality of other rates;

whereby maximum utilization of said cable results.

7. The improvement defined by claim 6 wherein each of said transmitters includes message generation means for generating a message for transmission on said cable at said first data rate.

8. The improvement defined by claim 7 wherein said message identifies the one of said receivers for which data is to be transmitted and one of said plurality of other data rates.

9. The improvement defined by claim 8 wherein each of said receivers includes power means responsive to said messages for causing said receivers to draw more power from said cable if said receiver is to receive data.

10. The improvement defined by claim 9 wherein said power means decreases the input impedance to said receiver.

* * * * *